United States Patent

Shigeno et al.

(10) Patent No.: US 7,456,400 B2
(45) Date of Patent: Nov. 25, 2008

(54) SCANNING PROBE MICROSCOPE AND SCANNING METHOD

(75) Inventors: Masatsugu Shigeno, Chiba (JP); Yoshiharu Shirakawabe, Chiba (JP); Amiko Nihei, Chiba (JP); Osamu Matsuzawa, Chiba (JP); Naoya Watanabe, Chiba (JP); Akira Inoue, Chiba (JP)

(73) Assignee: Seiko Instruments Inc. (JP)

( * ) Notice: Subject to any disclaimer, the term of this patent is extended or adjusted under 35 U.S.C. 154(b) by 295 days.

(21) Appl. No.: 11/235,458

(22) Filed: Sep. 26, 2005

(65) Prior Publication Data

US 2006/0113472 A1    Jun. 1, 2006

(30) Foreign Application Priority Data

Nov. 26, 2004   (JP)   .............................. 2004-342783

(51) Int. Cl.
*G12B 21/00*    (2006.01)

(52) U.S. Cl. .................. 250/306; 250/307; 250/310; 73/105; 977/860; 977/872; 977/849; 977/851; 977/852

(58) Field of Classification Search .............. 250/306, 250/305, 307, 308, 309, 310, 311, 442.11; 73/105; 977/849, 851, 852, 860, 872, 873, 977/953

See application file for complete search history.

(56) References Cited

U.S. PATENT DOCUMENTS 5,193,383 A * 3/1993 Burnham et al. .............. 73/105
5,436,448 A * 7/1995 Hosaka et al. ............... 250/306
5,652,377 A * 7/1997 Yagi ............................. 73/105
5,929,438 A * 7/1999 Suzuki et al. ................ 250/306
5,994,691 A * 11/1999 Konada ....................... 250/234
6,073,485 A * 6/2000 Kitamura ..................... 73/105
6,079,254 A * 6/2000 Chen et al. ................... 73/105
6,215,121 B1 * 4/2001 Fujihira et al. .............. 250/306
6,234,009 B1 * 5/2001 Chen et al. ................... 73/105
6,318,159 B1 * 11/2001 Chen et al. ................... 73/105
2002/0079446 A1 * 6/2002 Miyatani et al. ............ 250/306
2002/0178802 A1 * 12/2002 Ookubo ....................... 73/105
2005/0242283 A1 * 11/2005 Hasegawa et al. ........... 250/310

* cited by examiner

*Primary Examiner*—Jack I. Berman
*Assistant Examiner*—Michael J Logie
(74) *Attorney, Agent, or Firm*—Adams & Wilks

(57) ABSTRACT

A scanning probe microscope has a probe needle and a control section that controls relative scanning movement between the probe needle and a surface of a sample in at least one direction parallel to the sample surface and controls relative movement between the probe needle and the sample surface in a direction perpendicular to the sample surface. A vibration source vibrates the probe needle at a vibrating frequency relative to the sample surface. An approach/separation drive section causes the probe needle to relatively approach to and separate from the sample surface at a predetermined distance while the probe needle is vibrated at the vibrating frequency relative to the sample surface by the vibration source. A detection section detects a rate of change in a vibration state of the probe needle in accordance with a distance between the probe needle and the sample surface. An observation section gathers observation data from the sample surface when the rate of change in the vibration state of the probe needle detected by the detection section has exceeded a preselected threshold value.

18 Claims, 4 Drawing Sheets

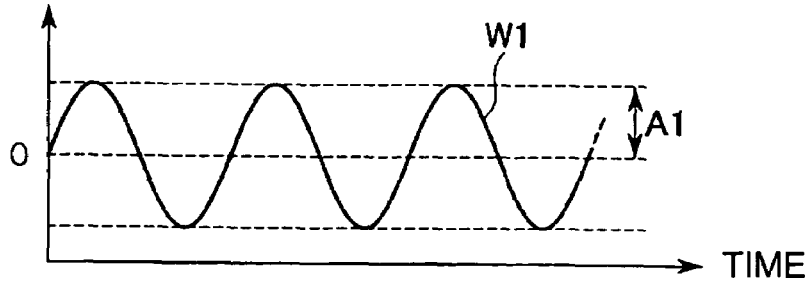
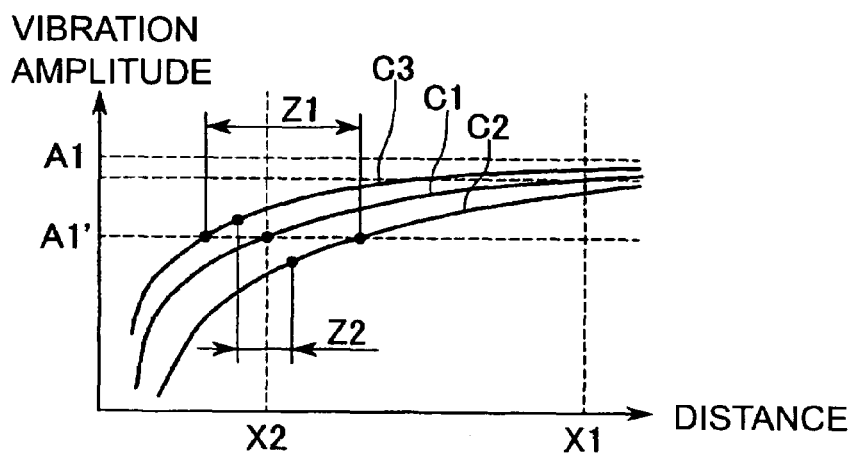
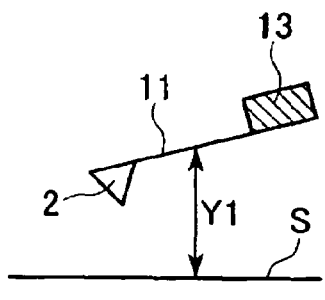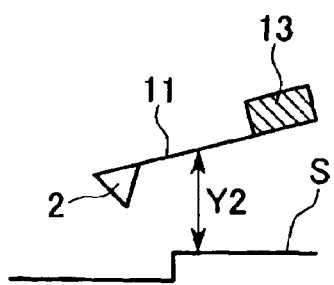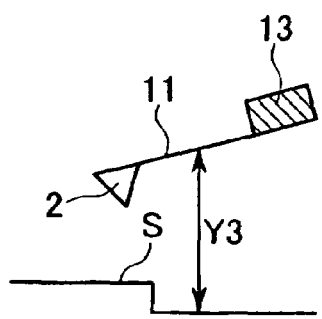

SCANNING PROBE MICROSCOPE AND SCANNING METHOD

BACKGROUND OF THE INVENTION

1. Field of the Invention

The present invention relates to a scanning probe microscope and a scanning method for obtaining physical property information, such as surface shape, of a sample by scanning a probe needle while being vibrated on a sample surface.

2. Description of the Related Art

As well known, as an apparatus for performing an observation of the surface shape of the sample and a measurement of the physical properties information by measuring the sample such as electronic material in a minute region, there is used the scanning probe microscope such as atomic force microscope (AFM) and scanning tunnel microscope (STM). In the scanning probe microscope of this kind, although there are provided various ones, as one of them there is known a vibration mode (AC mode) AFM which detects the surface shape and the like of the sample by scanning the probe needle parallel to the sample surface while being vibrated perpendicularly to the sample surface. In the vibration mode AFM, there are a system in which the probe needle is scanned so as not to contact with the sample surface under a state that the probe needle has been approached to the sample surface, and a system in which it is scanned while repeatedly beating the sample surface. (For example, refer to Patent Document 1.)

This vibration mode AFM possesses the probe needle attached to a tip of a cantilever. And, this probe needle is adapted so as to be capable of scanning with respect to the sample surface, and adapted so as to be capable of vibrating at a resonance frequency of the cantilever or its vicinity. In a case where the surface shape of the sample is measured by this vibration mode AFM, the probe needle is vibrated as mentioned above, and the probe needle and the sample surface are relatively approached. Since a force such as van der Waals force and repulsive force by a contact acts between the probe needle and the sample surface, a vibration state of the probe needle changes. Whereupon, when the probe needle has changed till a certain vibration state, it is judged that the probe needle and the sample surface have approached or contacted, and a measurement of the surface shape of the sample is performed by scanning the probe needle with respect to the sample surface while adjusting a distance between the probe needle and the sample surface so as to maintain the above vibration state.

[Patent Document 1] JP-A-7-270434 Gazette

However, in the above conventional scanning probe microscope, there are following problems. That is, in the above conventional scanning probe microscope, when there are irregularities in the sample surface, even if a distance between the probe needle and the sample surface in an observation position is made equal, since a difference in influence on the probe needle by the fact that the irregularities of the sample surface differ or a distance between the cantilever and the sample surface is changed by the irregularities of the sample surface, a different vibration state is shown. Although this vibrates the probe needle by the fact that the cantilever resonates or forcibly vibrates, since a ratio of a space compressed by this resonance or forcible vibration of the cantilever to a space between the cantilever and the sample surface changes by the irregularities of the sample surface, it follows that a damping effect (resisting effect) given to the cantilever differs. By this, it follows that the probe needle shows the different vibration state, and there is a problem that, even if the probe needle is scanned with respect to the sample surface by adjusting the distance between the probe needle an d the sample surface so as to maintain a certain vibration state, the distance between the probe needle and the sample surface does not become constant. Accordingly, there is a problem that probe needle and the sample surface cannot be accurately approached or contacted.

SUMMARY OF THE INVENTION

The present invention is one made in view of the problems mentioned above, and its object is to provide a scanning probe microscope and a scanning method which are capable of accurately approaching or contacting the probe needle and the sample surface irrespective of an irregularities shape of the sample surface.

In order to solve the above problems, the present invention has adopted the following constitution. That is, a scanning probe microscope probe concerned with the present invention is characterized in that—in a scanning probe microscope possessing a probe needle for relatively performing, with respect to a sample surface, scans in two directions parallel to the sample surface and a movement in a perpendicular direction of the sample surface, a detection means for detecting a measurement amount changing in compliance with a distance between the probe needle and the sample surface, an observation means for gathering an observation data in a point of time at which the probe needle has approached to or contacted with the sample surface, and a control means for controlling the sans in the two directions and the movement in the perpendicular direction—there is possessed an approach/separation means for causing the probe needle to relatively approach to and separate from the sample surface at a predetermined distance, the detection means detects a change rate of the measurement amount at an approach time and a separation time by the approach/separation means, and the observation means gathers the observation data when the change rate of the observation amount exceeds a previously set threshold value.

Further, a scanning method in a scanning probe microscope concerned with the present invention is characterized in that—in a scanning method in a scanning probe microscope which possesses a probe needle for relatively performing, with respect to a sample surface, scans in two directions parallel to the sample surface and a movement in a perpendicular direction of the sample surface, and in which an approach or contact state of the probe needle to the sample surface is judged on the basis of a measurement amount changing in compliance with a distance between the probe needle and the sample surface, and there is gathered an observation data in a point of time at which the probe needle has approached to or contacted with the sample surface—the observation data is gathered when a change rate of the measurement amount at an approach time and a separation time when a relative distance of the probe needle with respect to the sample surface has been caused to approach and separate by a predetermined distance exceeds a previously set threshold value.

According to this invention, the probe needle is relatively approached to and separated from the sample surface, the change rate of the measurement amount at the approach time and the measurement amount at the separation time is detected and, when this change rate exceeds the previously set threshold value, it is judged that the probe needle has approached to or contacted with the sample surface, thereby gathering the observation data. This measurement amount increases or decreases as the distance between the probe needle and the sample surface becomes small. Further, even in a case where the distance between the probe needle and the sample surface is equal, although this measurement amount shows, e.g., when irregularities are formed near an observation position, a different value in compliance with a surface shape of the observation position, this change rate of the measurement amount per unit length of the probe needle and the sample surface is small in a difference by the surface shape of the observation position in comparison with the difference in the measurement amount.

Whereupon, when the change rate of the measurement amount at the approach time and the measurement amount at the separation time exceeds the set threshold value by approaching and separating the probe needle to and from the sample surface, it is judged that the probe needle has approached to or contacted with the sample surface and, by gathering the observation data in that position, it is possible to accurately maintain the distance between the probe needle and the sample surface irrespective of the surface shape of the observation position. From the above, in comparison with the fact that the observation data is gathered when the observation amount exceeds the set threshold value, it is possible to gather more precise observation data.

Further, when the probe needle is approached to or contacted with the sample surface, it is possible to prevent adverse effects, due to the fact that the probe needle is pressed to the sample surface by a large force, on physical properties of the probe needle and the sample, and deformations and injuries of the sample and the probe needle.

Further, it is desirable that, in a scanning probe microscope concerned with the present invention, there is possessed a vibration applying means for resonating or forcibly vibrating the probe needle at a vibrating frequency, and the detection means detects a vibration state of the probe needle by the vibration applying means.

Further, it is desirable that, in a scanning method in a scanning probe microscope concerned with the present invention, the probe needle is caused to vibrate at a vibrating frequency resonating or forcibly vibrating it, thereby gathering the observation data in the point of time at which the probe needle has approached to or contacted with the sample.

According to this invention, if the probe needle is approached to the sample surface in the observation position, since the force such as van der Waals force and repulsive force by the contact acts between the probe needle and the sample, the vibration state of the probe needle changes. An action of this force increases as the distance between the probe needle and the sample surface becomes small. Accordingly, by relatively approaching and separating the probe needle to and from the sample surface, and detecting the change rate of the vibration state at the approach time and the separation time to thereby gather the observation data when this change rate exceeds the set threshold value, similarly to the above it is possible to accurately keep the distance between the probe needle and the sample surface irrespective of an irregularities shape of the observation position.

Further, it is desirable that, in a scanning probe microscope concerned with the present invention, the detection means detects, as the measurement amount, at least one of a vibration amplitude, a phase of vibration and a vibration frequency of the probe needle.

Further, it is desirable that, in a scanning method in a scanning probe microscope concerned with the present invention, the detection means detects, as the measurement amount, at least one of a vibration amplitude, a phase of vibration and a vibration frequency of the probe needle.

According to this invention, by the fact that the detection means pays attention, as the measurement amount, to at least one among a change rate of the vibration amplitude, a change rate of the phase of vibration and a change rate of the vibration frequency of the probe needle, it is possible to easily discriminate the fact that the probe needle has approached to or contacted with the sample surface.

Further, it is desirable that, in a scanning probe microscope concerned with the present invention, the detection means detects a tunnel current flowing between the probe needle and the sample.

Further, it is desirable that, in a scanning method in a scanning probe microscope concerned with the present invention, the observation data is gathered by detecting a tunnel current flowing between the probe needle and the sample.

According to this invention, if the probe needle is approached to the sample surface in the observation position, the tunnel current flows between the probe needle and the sample. This tunnel current gradually increases as the distance between the probe needle and the sample surface becomes small, and a change amount per unit length of the distance between the probe needle and the sample surface also increases. Accordingly, similarly to the above, by detecting a change rate of a value of the tunnel current of the probe needle at the approach time and the separation time and gathering the observation data when this change rate exceeds the set threshold value, it is possible to accurately keep the distance between the probe needle and the sample surface irrespective of the irregularities shape of the observation position.

Further, it is desirable that, in a scanning probe microscope concerned with the present invention, the control means causes the probe needle to scan such that the change rate of the measurement amount becomes the set threshold value.

Further, it is desirable that, in a scanning method in a scanning probe microscope concerned with the present invention, the probe needle is scanned while changing a relative distance of the probe needle in the perpendicular direction with respect to the sample surface such that the change rate of the measurement amount becomes the set threshold value.

According to this invention, the scan is performed while accurately keeping the distance between the probe needle and the sample surface by adjusting the distance between the probe needle and the sample surface such that the change rate of the measurement amount becomes the set threshold value.

Further, it is desirable that, in a scanning probe microscope concerned with the present invention, after gathering the observation data, the control means causes the probe needle to scan in the direction parallel to the sample surface till it reaches to an observation position in next time and, when the change rate of the measurement amount has exceeded the set threshold value during the scans, causes the probe needle to move in the perpendicular direction separating from the sample surface.

Further, it is desirable that, in a scanning method in a scanning probe microscope concerned with the present invention, when the change rate of the measurement amount has exceeded the set threshold value, the scans of the probe needle are stopped, and the probe needle is once moved in the perpendicular direction separating from the sample surface.

According to this invention, in a case where, when the probe needle has been scanned in the direction parallel to the sample surface, the probe needle has approached to a convex part of the sample surface, it follows that the change rate of the measurement amount exceeds the set threshold value, and it is judged that the probe needle has approached to or contacted with the sample surface. Whereupon, after moving the probe needle in the perpendicular direction separating from the sample surface, the scan is performed again in the direction parallel to the sample surface. By this, even if the convex part of the sample surface exists in a scanning path of the probe needle, it is possible to perform the scan in a shortest path along a shape of the convex part as far as possible while avoiding this convex part. Accordingly, it is possible to contrive to shorten a scanning time, in other words, shorten a measurement time, so that a throughput is improved.

Incidentally, it is desirable that a distance in which the probe needle is separated from the sample surface is 1 nm or more. By doing like this, in a case where a humidity, a temperature and the like are low, it is possible to certainly pull up the probe needle till a position where it does not undergo an influence of an adsorbed water layer. Further, since no superfluous pulling-up time is required, it is possible to contrive to shorten the measurement time. Further, the distance to be separated may be made 10 nm or more. By doing like this, even under such a clear state that the humidity is 99%, the probe needle can be certainly pulled up till the position where it does not undergo the influence of the adsorbed water layer.

According to a scanning probe microscope and a scanning method which are concerned with this invention, since the change rate of the measurement amount at the approach time and the separation time is detected by relatively approaching and separating the probe needle to and from the sample surface and the observation data is gathered when this change rate exceeds the previously set threshold value, it is possible to accurately maintain the distance between the probe needle and the sample surface irrespective of the surface shape of the sample in the observation position in comparison with the fact that the observation data is gathered when the measurement amount exceeds the set threshold value. Accordingly, it is possible together a more precise observation data.

Further, by the fact that the distance between the probe needle and the sample surface can be accurately maintained, it is possible to prevent the adverse effects, due to the fact that the probe needle is pressed to the sample surface by the large force, on the physical properties of the probe needle and the sample, and the deformations and the injuries of the sample and the probe needle.

BRIEF DESCRIPTION OF THE DRAWINGS

In the accompanying drawings:

FIG. 2 is a vibration waveform diagram for explaining an attenuation degree of a vibration amplitude of a probe needle in the scanning probe microscope shown in FIG. 1;

FIG. 3 is a graph showing a relation between a distance between the probe needle and a sample surface and the attenuation degree of the vibration amplitude of the probe needle in the scanning probe microscope shown in FIG. 1;

FIG. 4A-4C are explanatory views showing a relation between a cantilever and the sample surface in a sample surface shape;

FIG. 5 is a vibration waveform diagram for explaining the attenuation degree of the vibration amplitude of the probe needle, wherein

FIG. 6 is similarly a vibration waveform diagram for explaining the attenuation degree of the vibration amplitude of the probe needle, wherein

DETAILED DESCRIPTION OF THE PREFERRED EMBODIMENTS

Figure 1:
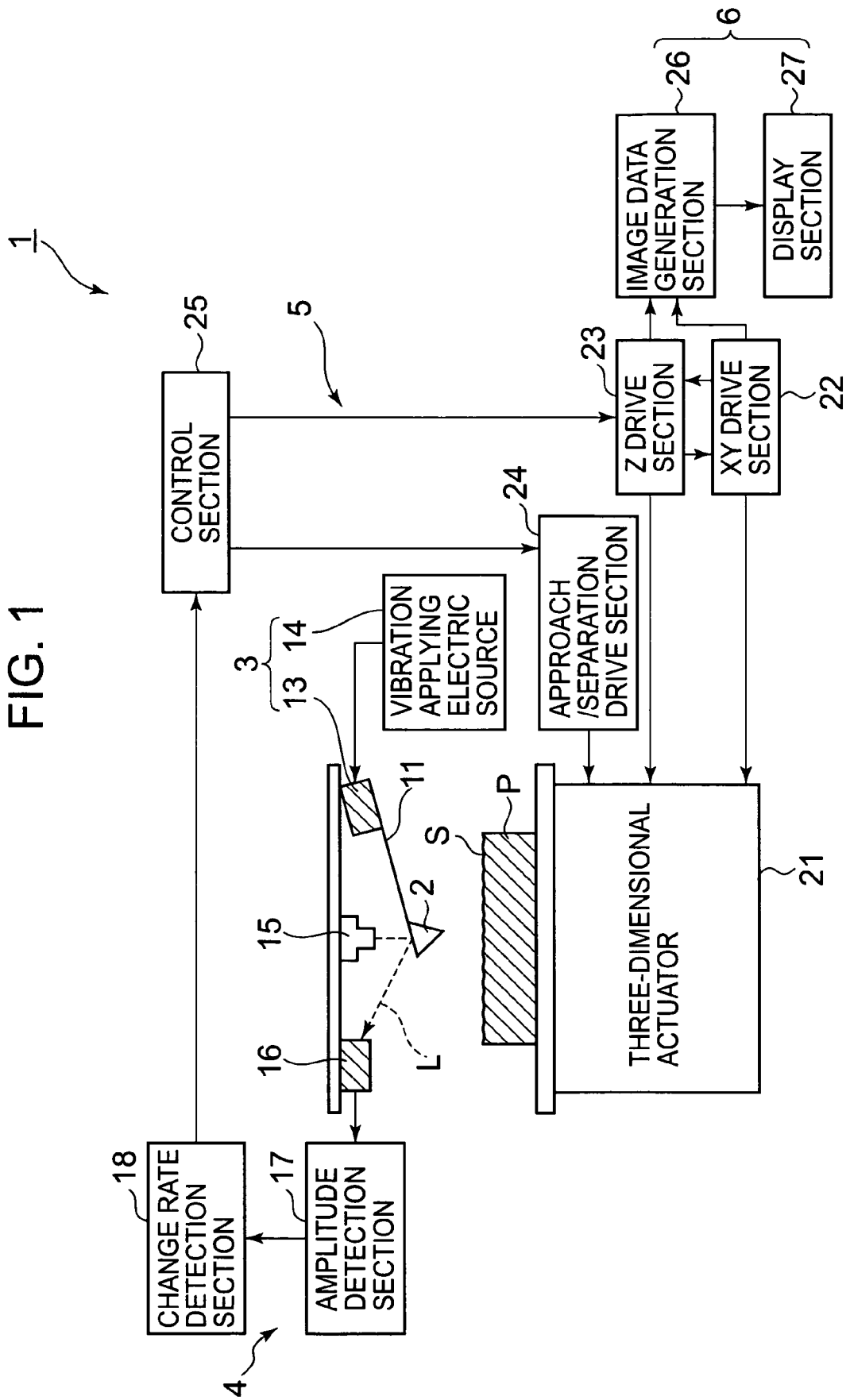
FIG. 1 is a block diagram showing a scanning probe microscope concerned with a 1st embodiment of the present invention.

Hereunder, it is explained about a 1st embodiment of a scanning probe microscope concerned with the present invention while referring to FIG. 1.

As shown in FIG. 1, a scanning probe microscope 1 according to the present embodiment possesses a probe needle 2 for relatively performing scans in X, Y directions parallel to a surface (hereafter, sample surface S) of a sample P and a movement in a Z direction perpendicular to the sample surface S with respect to the sample surface S, a vibration applying means 3 for vibrating the probe needle 2 at a vibrating frequency by which it is resonated or forcibly vibrated, a detection means 4 for detecting a vibration state of the probe needle 2 in a point of time at which the probe needle 2 has approached to or contacted with the sample surface S, a control means 5 for controlling the scans in the X, Y directions and the relative movement, in the Z direction with respect to the sample P, of the probe needle 2, and an observation means 6 for gathering an observation data in the point of time at which the probe needle 2 has approached to or contacted with the sample surface S.

The probe needle 2 is provided in one end of a cantilever 11, and disposed above the sample P mounted on a stage 12 so as to be opposite to the sample P.

The vibration applying means 3 is constituted by a bimorph 13 provided in the other end of the cantilever 11, and a vibration applying electric source 14 for causing the cantilever 11 to resonate or forcibly vibrate by applying a predetermined voltage to the bimorph 13. Incidentally, the vibrating frequency of the bimorph 13 is 100 kHz for instance, and the probe needle 2 is vibrated at this vibrating frequency. Further, a vibration amplitude of the probe needle 2 by the bimorph 13 becomes 0.5 nm-500 nm for instance.

Further, the stage 12 is fixed to a three-dimensional actuator 21 mentioned later, and by this the probe needle 2 is made relatively movable in X, Y, Z directions with respect to the sample surface S through the cantilever 11 and the three-dimensional actuator 21. And, the stage 12 is constituted such that it is vibrated in the Z direction by the three-dimensional actuator 21, thereby periodically approaching to and separating from the probe needle 2. Incidentally, an approaching/separating frequency for approaching and separating the sample surface S to and from the probe needle 2 is a frequency lower than the vibrating frequency of the bimorph 13, and becomes 300 kHz for instance. Further, an amplitude of the sample surface S approaching to and separating from the cantilever 11 becomes 5 nm for instance.

The detection means 4 is constituted by a laser generator 15 for irradiating a laser light L to a back face of the cantilever 11, a cantilever displacement detector 16 for receiving the laser light L reflected by the back face of the cantilever 11, an amplitude detection section 17 for calculating the vibration amplitude of the probe needle 2 on the basis of a displacement amount, of the cantilever 11, transmitted from the cantilever displacement detector 16, and a change rate detection section 18 for calculating a change amount of the vibration amplitude calculated by the amplitude detection section 17 before and after the approach to and separation from the sample surface S.

The cantilever displacement detector 16 is constituted by a photodetector for instance. And, the cantilever displacement detector 16 has a function of detecting a displacement amount of the cantilever 11 by receiving the laser light L reflected by the back face of the cantilever 11 and measuring an incident position. That is, since a reflection position of the laser light L irradiated from the laser generator 15 to the back face of the cantilever 11 changes in compliance with a vibration state of the cantilever 11, the incident position to the cantilever displacement detector 16 changes. This cantilever displacement detector 16 is adapted such that the change amount of the cantilever 11 is outputted to the amplitude detection section 17 as a vibration waveform complying with this incident position.

The amplitude detection section 17 is adapted so as to calculate the vibration amplitude of the probe needle 2 on the basis of the vibration waveform that is the displacement amount, of the cantilever 11, transmitted from the cantilever displacement detector 16, thereby outputting it to the change rate detection section 18.

The change rate detection section 18 has a function of causing the stage 12 to approach to and separate from the probe needle 2 by the three-dimensional actuator 21 to thereby calculate a proportion between the vibration amplitude of the probe needle 2 when it has approached to the sample surface S and the vibration amplitude of the probe needle 2 when it has separated from the same. And, the change rate detection section 18 is adapted so as to inform, when a change rate of the vibration amplitude of the probe needle 2 before and after the sample surface S is caused to approach to and separate from the probe needle 2 is under a state exceeding a previously set threshold value, to that effect to a control section 25 mentioned later.

The control means 5 is constituted by the three-dimensional actuator 21, an XY drive section 22 for relatively scanning the probe needle 2 in the X, Y directions by driving the three-dimensional actuator 21, a Z drive section 23 for relatively moving the probe needle 2 in the Z direction by driving the three-dimensional actuator 21, an approach/separation drive section (approach/separation means) 24 for vibrating the stage 12 with respect to the probe needle 2, and the control section 25 for synthetically controlling the XY drive section 22, the Z drive section 23 and the approach/separation drive section 24.

The three-dimensional actuator 21 is constituted by a roughly moving mechanism constituted by a step motor, and a finely moving element constituted by a piezoelectric element (piezo-element). The roughly moving mechanism has a function of causing the sample P to approach to and separate from the probe needle 2 by a feed screw system by a drive electric source such as stepping motor.

The control section 25 is constituted so as to control the Z drive section 23 on the basis of the change rate, of the vibration amplitude of the probe needle 2, detected by the change rate detection section 18 as mentioned above. Further, the control section 25 is adapted such that, if the change rate detection section 18 is informed of the fact that the change rate of the vibration amplitude of the probe needle 2 before and after the stage 12 is caused to approach to and separate from the probe needle 2 has exceeded the previously set threshold value, it stops an upward movement of the stage 12 in the Z direction to the probe needle 2 by the three-dimensional actuator 21. As to a detail of an operation of this control section 25, it is mentioned later.

The observation means 6 is constituted by an image data generation section 26, and a display section 27 connected to the image data generation section 26.

The image data generation section 26 is connected to the XY drive section 22 and the Z drive section 23, and constituted so as to detect a position of the probe needle 2 on the basis of dive data of the XY drive section 22 and the Z drive section 23 and gather a data of this position as an observation data.

The display section 27 is constituted, for example, by a monitor and the like, and displays the observation data gathered in the image data generation section 26.

Next, a method of observing the sample P using the scanning probe microscope 1 according to the present invention is described.

First, an electric source is supplied to the bimorph 13 by the vibration applying electric source 14 shown in FIG. 1, thereby vibrating the probe needle 2 at the vibrating frequency. Further, the control section 25 operates the approach/separation drive section 24, thereby vibrating the stage 12 in the Z direction to cause the sample surface S to approach to and separate from the probe needle 2. Under this state, the control section 25 controls the Z drive section 23 to move the three-dimensional actuator 21 in the Z direction, thereby approaching the sample surface S to the probe needle 2. Incidentally, the probe needle 2 vibrates at a vibration amplitude A1 by the vibration applying electric source 14 like a vibration waveform W1 shown in FIG. 2.

Under this state, if a distance between the probe needle 2 and the sample surface S is being made relatively small, the van der Waals force and the repulsive force by the contact act between the probe needle 2 and the sample P. By this, it becomes a state that the vibration amplitude of the probe needle 2 has been attenuated.

Here, by using FIG. 3 and FIG. 4 it is explained about an irregularities shape of the sample surface S in the observation position, the distance between the probe needle 2 and the sample surface S, and an attenuation degree of the vibration amplitude by influences of the van der Waals force, the repulsive force by the contact and the like. As shown in FIG. 3, the influences of the van der Waals force, the repulsive force by the contact and the like on the vibration amplitude gradually increase as the distance between the probe needle 2 and the sample surface S decreases, and also a change rate per unit length of the distance between the probe needle 2 and the sample surface S increases.

Further, as shown in FIG. 4A, in a case where a shape of the sample surface S in the observation position is approximately equal by comparing a projected position of the probe needle 2 and a projected position of the cantilever 11, the distance between the probe needle 2 and the sample surface S and the vibration amplitude become a relation like a curved line C1 shown in FIG. 3. And, as shown in FIG. 4B, in a case where the shape of the sample surface S in the observation position becomes higher than the probe needle 2 in the cantilever 11 side, the distance between the probe needle 2 and the sample surface S and the vibration amplitude become a relation like a curved line C2 shown in FIG. 3. Additionally, as shown in FIG. 4C, in a case where the shape of the sample surface S in the observation position becomes lower than the probe needle 2 in the cantilever 11 side, the distance between the probe needle 2 and the sample surface S and the vibration amplitude become a relation like a curved line C3 shown in FIG. 3.

When the sample surface S in the observation position is the shape shown in FIG. 4B, the vibration amplitude becomes liable to attenuate as shown in FIG. 3. This is being performed by the fact that the vibration of the probe needle 2 is performed by vibrating the cantilever 11 by the bimorph 13 and, if the probe needle 2 is caused to relatively approach to the sample surface S under a state that the probe needle 2 is vibrated, a space between the sample surface S and the cantilever 11 is compressed by the fact that the cantilever 11 is vibrating. Here, in comparison with FIG. 4A, even if a distance between the probe needle 2 and the observation position of the sample surface S is equal, since a distance between the cantilever 11 and the sample surface S is short (Y1>Y2 in FIG. 4), a ratio between a volume of the space compressed by the vibration of the cantilever 11 and a volume of the space between the cantilever 11 and the sample surface S becomes large in comparison with a case where the shape of the sample surface S is FIG. 4A. By this, the damping effect (resisting effect) by the air between the cantilever 11 and the sample surface S becomes large, and the vibration of the cantilever 11 undergoes a restriction. By this, the vibration amplitude of the probe needle 2 becomes liable to attenuate.

Further, when the sample surface S in the observation position is the shape shown in FIG. 4C, the vibration amplitude becomes difficult to attenuate as shown in FIG. 3. Here, similarly to the above, in comparison with FIG. 4A, even if the distance between the probe needle 2 and the observation position of the sample surface S is equal, since the distance between the cantilever 11 and the sample surface S is long (Y1<Y3 in FIG. 4), the ratio between the volume of the space compressed by the vibration of the cantilever 11 and the volume of the space between the cantilever 11 and the sample surface S becomes small in comparison with the case where the shape of the sample surface S is FIG. 4A. By this, the damping effect by the air between the cantilever 11 and the sample surface S becomes small, so that the vibration amplitude of the probe needle 2 becomes difficult to attenuate.

Figure 5A:
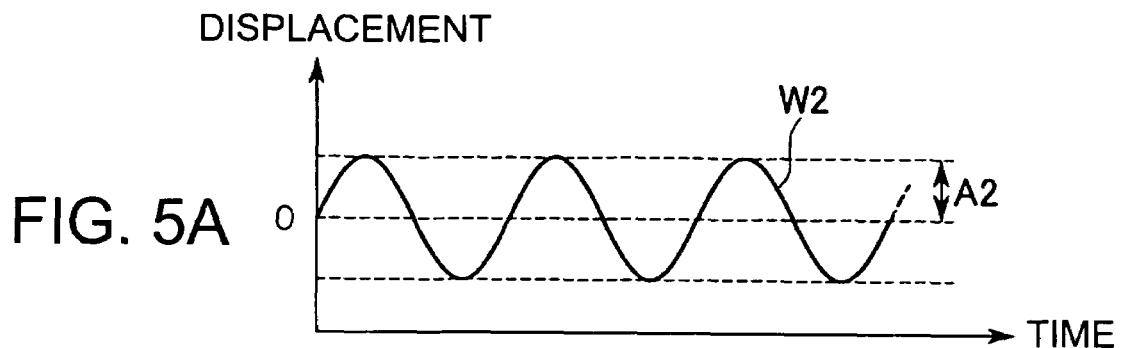
FIG. 5A is one at an approach time.
Figure 5B:
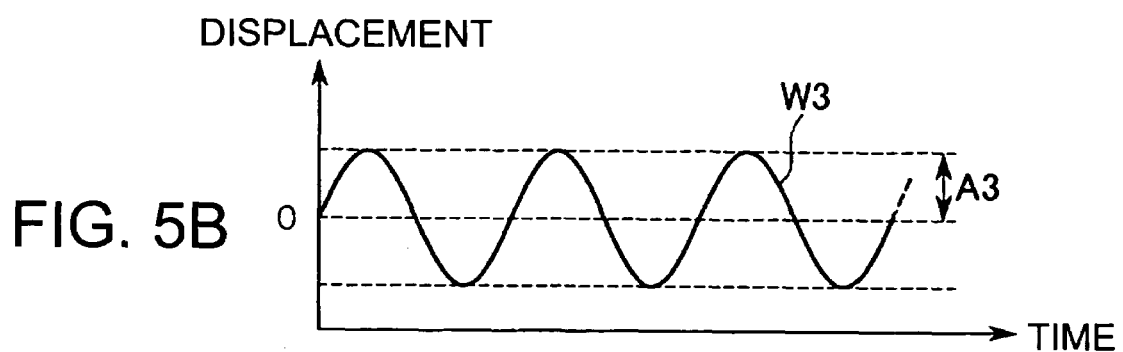
FIG. 5B is one at a separation time.

When the probe needle 2 vibrated at a vibration amplitude A1 is relatively moved toward the sample surface S and the distance between the probe needle 2 and the sample surface S is X1 shown in FIG. 3, if the stage 12 is approached to and separated from the probe needle 2 in the case where the sample surface S is the shape shown in FIG. 4A, the vibration waveform of the probe needle 2 becomes, at an approach time, a state having attenuated to a vibration waveform W2 whose vibration amplitude is A2 as shown in FIG. 5A and becomes, at a separation time, a vibration waveform W3 whose amplitude is A3 as shown in FIG. 5B.

The vibration amplitude detection section 17 calculates the vibration amplitude of the probe needle 2 from the displacement amount, of the cantilever 11, transmitted from the cantilever displacement detector 16, and outputs it to the change rate detection section 18. And, the change rate detection section 18 calculates a change rate (A3/A2) between the vibration amplitude A2 at the approach time and the vibration amplitude A3 at the separation time when the probe needle 2 is approached to and separated from the sample surface S. Here, when this change rate has exceeded a previously set threshold value, it is judged that the probe needle 2 has approached to or contacted with the sample surface S, and the control section 25 is notified to that effect.

Figure 6A:
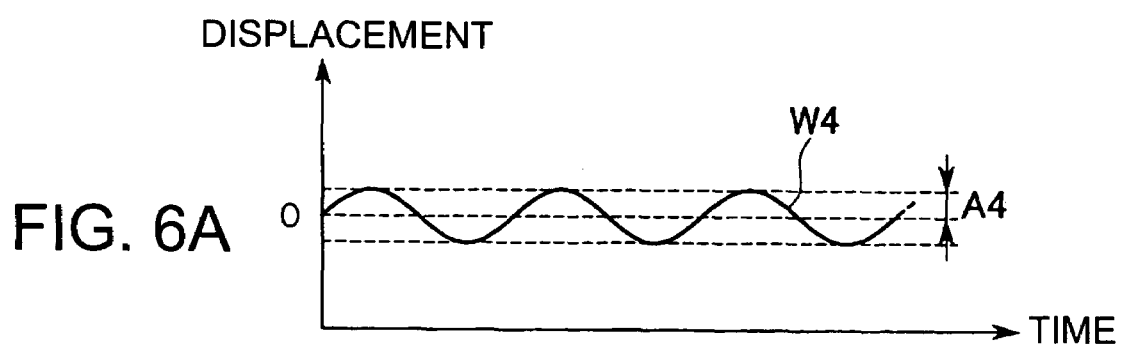
FIG. 6A is one at the approach time.
Figure 6B:
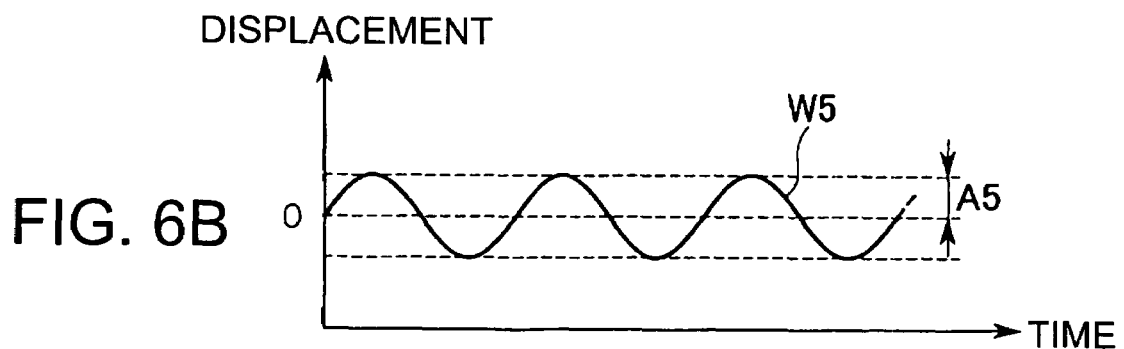
FIG. 6B is one at the separation time.

Further, when the change rate does not reach to the set threshold value, the stage 12 is moved upward, thereby approaching the probe needle 2 and the sample surface S. Here, similarly to the above, if the sample surface S is approached to and separated from the probe needle 2, it becomes, at the approach time, a state having attenuated to a vibration waveform W4 whose vibration amplitude is A4 as shown in FIG. 6A and becomes, at the separation time, a vibration waveform W5 whose amplitude is A5 as shown in FIG. 6B. And, similarly to the above, the change rate detection section 18 calculates a change rate (A5/A4) between the vibration amplitude A4 at the approach time and the vibration amplitude A5 at the separation time when the probe needle 2 and the sample surface S are approached and separated. Here, when this change rate exceeds the set threshold value, it is judged that the probe needle 2 has approached to or contacted with the sample surface S, and the control section 25 is notified to that effect.

Here, there is considered a case where, when it has been detected that the probe needle 2 has vibrated at a vibration amplitude A1' shown in FIG. 3, it is judged that the probe needle 2 has approached to or contacted with the sample surface S. First, when the sample surface S is the shape shown in FIG. 4A, the distance between the probe needle 2 and the sample surface S is an X2 shown in FIG. 3, and the probe needle 2 vibrates at the vibration amplitude A1'. However, it follows that the distance between the probe needle 2 becoming the vibration amplitude A1' and the sample surface S changes in a range of a Z1 shown in FIG. 3 by the shape of the sample surface S like when the sample surface S becomes the shapes shown in FIG. 4B or FIG. 4C.

Further, when the sample surface S is the shape shown in FIG. 4A and the distance between the probe needle 2 and the sample surface S is the X2 shown in FIG. 3, the change rate of the vibration amplitude when the stage 12 has been approached to and separated from the probe needle 2 shows a certain value. Here, it follows that the distance between the probe needle 2 whose change rate of the vibration amplitude becomes this value and the sample surface S changes in a range of a Z2 shown in FIG. 3 by the shape of the sample surface S like when the sample surface S becomes the shapes shown in FIG. 4B or FIG. 4C.

From these, it is understood that, by judging that the probe needle 2 has approached to or contacted with the sample surface S when the change rate of the vibration amplitude has exceeded a certain threshold value, it is difficult to undergo an influence of the shape of the sample surface S in comparison with judging when the vibration amplitude has exceeded the certain threshold value.

The control section 25 stops the Z drive section 23 by receiving from the change rate detection section 18 the fact that it has been judged that a change amount of the vibration amplitude of the probe needle 2 with respect to the sample surface S has exceeded the threshold value, thereby stopping an upward movement of the three-dimensional actuator 21 in the Z direction. Incidentally, here, although the upward movement of the three-dimensional actuator 21 in the Z direction is being stopped, movements of the stage 12 approaching to and separating from the probe needle 2 are being consecutively performed. By this, since the approach between the probe needle 2 and the sample P is stopped before a large load is given to the sample P, there is no fact that a great load is applied to the probe needle 2 and the sample P. Further, in a position where the stage 12 has stopped, the image data generation section 26 gathers an observation data in this observation position, i.e., position data in the Z direction.

And, the control section 25 controls the XY drive section 22 to move the three-dimensional actuator 21 in the X direction or the Y direction or both the directions, thereby scanning the probe needle 2 in the sample surface S. Here, the control section 25 controls the Z drive section 23 such that the change amount of the vibration amplitude of the probe needle 2 with respect to the sample surface S becomes the set threshold value, thereby moving the three-dimensional actuator 21 in the Z direction and suitably adjusting the distance between the probe needle 2 and the sample surface S. By doing like this, the scan in a predetermined range of the sample surface S is performed, thereby gathering the observation data. The observation data gathered like this by the scan of the probe needle 2 may be displayed to the display section 27.

According to the scanning probe microscope 1 and the scanning method which have been constituted like the above, since the change rate of the vibration amplitude at the approach time and the separation time is detected by relatively approaching and separating the probe needle 2 to and from the sample surface S and the observation data is gathered when this change rate exceeds the set threshold value, it is possible to accurately maintain the distance between the probe needle 2 and the sample surface S without depending on the shape of the sample surface S in the observation position in comparison with gathering the observation data when the vibration amplitude of the probe needle 2 becomes a certain value. Accordingly, it is possible to gather a more accurate observation data.

Further, by accurately maintaining the distance between the probe needle 2 and the sample surface S, there are avoided the adverse effects, due to the fact that the probe needle 2 is pressed to the sample surface S by the great force, on the physical properties of the probe needle 2 and the sample P, and the deformations and the injuries of the sample P and the probe needle 2.

Next, it is explained about a 2nd embodiment of the scanning probe microscope concerned with the present invention. Incidentally, in the following explanations, the same reference numeral is applied to the constituent element explained in the above embodiment, and its explanation is omitted.

A point different between the 2nd embodiment and the 1st embodiment is a point that while the probe needle 2 is scanned along the sample surface S in the 1st embodiment in the scanning probe microscope of the 2nd embodiment, the probe needle 2 is moved to a next observation position after it has been once relatively pulled up after the observation data has been gathered.

That is, the scanning probe microscope 1 of the present embodiment is set such that, after the control section 25 has gathered the observation data by controlling the XY drive section 22 and the Z drive section 23, the probe needle 2 and the sample surface S are moved in the Z direction separating them, the probe needle 2 is relatively scanned in a direction parallel to the sample surface S till it reaches to the observation position of a next time in the X direction or the Y direction, the scan is once stopped when it has been judged that the change rate of the vibration amplitude of the probe needle 2 has exceeded the set threshold value during the above scan and, after the probe needle 2 and the sample surface S have been moved in the Z direction separating them, the scan is continued again.

In other words, the control section 25 is adapted such that, if there is notified from the change rate detection section 18 the fact that the change rate of the vibration amplitude of the probe needle 2 has exceeded the previously set threshold value, a pulling-down of the stage 12 is performed till it becomes a state that the above change rate of the vibration amplitude does not exceed the set threshold value.

Next, it is explained about a method of observing the sample P, which uses the scanning probe microscope constituted like this. In the present embodiment, it is explained about a case of scanning the sample P in which the sample surface S is such an irregularities shape as shown in FIG. 7.

First, similarly to the 1st embodiment mentioned above, the probe needle 2 is vibrated at a vibration frequency, and the stage 12 is vibrated in the Z direction, thereby being approached to and separated from the probe needle 2. And, under this state, the three-dimensional actuator 21 is moved in the Z direction, and the sample surface S and the probe needle 2 are approached till the change rate of the vibration amplitude of the probe needle 2 exceeds the set threshold value. Thereafter, the image data generation section 26 gathers the Observation data in this observation position 30, i.e., position data in the Z direction.

Next, the control section 25 controls the Z drive section 23 to thereby move the probe needle 2 and the sample surface S by 10 nm for instance in the direction separating them. Even if the probe needle 2 has been caught by the adsorbed water layer not shown in the drawing, which exists in the sample surfaces, it is possible to certainly pull up the probe needle 2 from this adsorbed water layer by pulling down the stage 12 by 10 nm.

Figure 7:
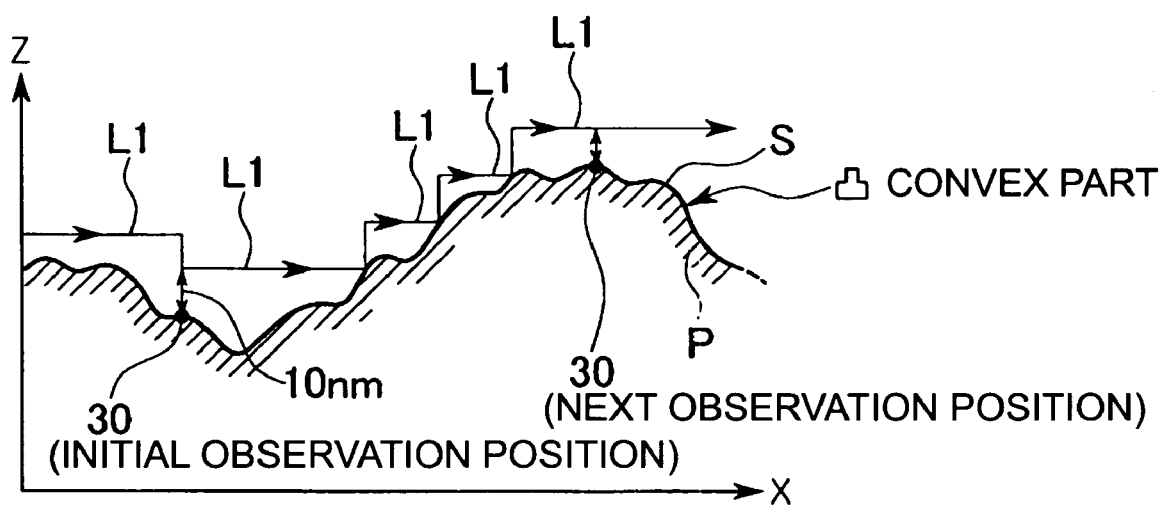
FIG. 7 is a view showing a scanning locus of the probe needle, for explaining a scanning method concerned with a 2nd embodiment of the present invention.

And, after the stage 12 has been pulled down, the control section 25 stops the Z drive section 23, and controls the XY drive section 22 to thereby relatively scan the probe needle 2 again like an XY locus L1 shown in FIG. 7. Incidentally, by pulling down the stage 12 by 10 nm, the change rate of the vibration amplitude of the probe needle 2 becomes a state not exceeding the set threshold value. On this occasion, as mentioned above, since the probe needle 2 is under a state escaping from the adsorbed water layer, it is possible to perform the scan without undergoing the influence of the adsorbed water layer.

On the occasion of this scan, as shown in FIG. 7, in a case where the probe needle 2 has approached to a convex part of the sample surface S, since the change rate of the vibration amplitude of the probe needle 2 becomes a state exceeding the set threshold value, the change rate detection section 18 informs the control section 25 to the effect that the probe needle 2 and the sample surface S have approached or contacted. On receiving this, the control section 25 stops the XY drive section 22 to thereby once stop the scan, and causes the Z drive section 23 to operate, thereby moving the stage 12 till the change rate in the Z direction separating from the probe needle 2 becomes the state not exceeding the set threshold value. After this movement in the Z direction, the control section 25 stops the Z drive section 23, and causes the XY drive section 22 to operate, thereby performing the scan of the probe needle 2.

By repeating this, if the probe needle 2 reaches to a next observation position 30, the image data generation section 26 gathers the observation data in this observation position, i.e., position data in the Z direction. And, the scan is performed toward a still next observation position. By doing like the above, the scan of the sample surface S is performed.

According to the scanning probe microscope constituted like this, although there are obtained an action and an effect which are similar to the 1st embodiment mentioned above, since the control section 25 performs, every time it is judged by the change rate detection section 18 that the change rate of the vibration amplitude of the probe needle 2 has exceeded the set threshold value, the scan while pulling down the stage 12 till the change rate of the vibration amplitude becomes the state not exceeding the set threshold value, even if the convex part of the sample surface S exists in a scanning path of the probe needle 2, the scan can be performed in a shortest path as much as possible along a shape of this convex part while avoiding the convex part. Accordingly, it is possible to contrive a reduction in scanning time, in other words, reduction in measuring time, and a throughput is improved.

Incidentally, a technical scope of the present invention is not one limited to the above embodiments and, in a scope not deviating from a gist of the present invention, it is possible to add various modifications.

For example, in each of the above embodiments, although the detection means detects the change rate of the vibration amplitude of the probe needle, it is not limited to this and a change rate of a vibration state of the probe needle may be detected by paying attention to, e.g., a change rate of a phase of the vibration, a change rate of a frequency of the vibration, and the like. Incidentally, also in these cases, when the change rate of the phase of the vibration has become the state exceeding the set threshold value and when the change rate of the frequency of the vibration has become the state exceeding the set threshold value, it is judged respectively that the probe needle has approached to or contacted with the sample surface.

Further, the detection means may be adapted so as to detect a current quantity of tunnel current flowing between the probe needle and the sample. The current quantity of tunnel current flowing between the probe needle and the sample gradually increases as the distance between the probe needle and the sample becomes small, and a change amount per unit length of the distance between the probe needle and the sample also increases. Accordingly, by detecting a change rate of the current quantity at the approach time and the separation time, when this change rate has exceeded the set threshold value, it is judged that the probe needle has approached to or contacted with the sample surface.

Further, although the observation means has gathered the position data as the observation data, it is not limited to this, and there may be measured constants concerning elasticity and viscosity and physical properties quantities such as electric resistance and adsorption force of the sample. Additionally, not gathering only one among these observation data, there may be gathered the observation data of different kinds at the same time under the state that the probe needle has approached to or contacted with the sample surface. By doing like this, it is possible to efficiently gather desired various observation data at one time.

Additionally, in addition to the observation data gathered under the state that the probe needle has approached to or contacted with the sample surface, there may be adapted such that the control means sets the probe needle so as to be disposed to a position separated from the sample surface in the Z direction by a certain distance, thereby gathering the observation data again in this position. By doing like this, the observation means can obtain, under a state that an influence of the shape has been reduced, a three-dimensional distribution of physical quantities, e.g., three-dimensional magnetic distribution image and the like, from the sample surface, so that it is possible to gather more multipronged observation data. Here, by gathering the observation data which are the same or different kind(s) in the separated position and the approached or contacted position, it is possible to gather more effective observation data.

And, although the stage is moved in the X direction, the Y direction and the Z direction by the three-dimensional actuator, one capable of moving the probe needle relatively to the sample suffices, and the probe needle may be moved by the three-dimensional actuator.

Further, although the change amount of the probe needle portion has been detected by the cantilever of a light detection system, it is not one limited to the cantilever of the light detection system, and there may be used a self-detection lever which detects its own change amount.

What is claimed is:

1. A scanning probe microscope comprising:
   a probe needle;
   control means for controlling relative scanning movement between the probe needle and a sample surface in two directions parallel to the sample surface and controlling relative movement between the probe needle and the sample surface in a direction perpendicular to the sample surface;
   vibration applying means for resonating or forcibly vibrating the probe needle at a vibrating frequency relative to the sample surface;
   approach/separation means for causing the probe needle to relatively approach to and separate from the sample surface at a predetermined distance while the probe needle is vibrated at the vibrating frequency relative to the sample surface by the vibration applying means;
   detection means for detecting a rate of change in a vibration state of the probe needle in accordance with a distance between the probe needle and the sample surface when the probe needle is caused to approach to and separate from the sample surface by the approach/separation means; and
   observation means for gathering observation data from the sample surface when the probe needle has been caused to approach or contact the sample surface and the rate of change in the vibration state of the probe needle detected by the detection means has exceeded a previously set threshold value.

2. A scanning probe microscope according to claim 1; wherein the vibration state of the probe needle comprises least one of a vibration amplitude, a phase of vibration and a vibration frequency of the probe needle.

3. A scanning probe microscope according to claim 1; wherein the detection means detects a tunnel current flowing between the probe needle and the sample.

4. A scanning probe microscope according to claim 1; wherein the control means controls the relative scanning movement between the probe needle and the sample surface such that the rate of change in a vibration state of the probe needle becomes the set threshold value.

5. A scanning probe microscope according to claim 1; wherein the observation means gathers the observation data from an observation position on the sample surface; and wherein after the observation means gathers the observation data from the observation position, the control means controls the relative scanning movement between the probe needle and the sample surface until the probe needle reaches a next observation position on the sample surface and, when the rate of change in the vibration state of the probe needle has exceeded the set threshold value during the scanning movement, the control means controls relative movement between the probe needle and the sample surface in the direction perpendicular to the sample surface to separate the probe needle from the sample surface.

6. A scanning method for a scanning probe microscope:
   providing a scanning probe microscope having a probe needle and control means for controlling relative scanning movement between the probe needle and a sample surface in two directions parallel to the sample surface and relative movement between the probe needle and the sample surface in a direction perpendicular to the sample surface;
   forcibly vibrating the probe needle at a vibrating frequency relative to the sample surface;
   causing the probe needle to relatively approach to and separate from the sample surface at a predetermined distance while the probe needle is vibrated at the vibrating frequency relative to the sample surface;
   detecting a rate of change in a vibration state of the probe needle in accordance with a distance between the probe needle and the sample surface when the probe needle is caused to approach to and separate from the sample surface; and
   gathering observation data from the sample surface when the probe needle has been caused to approach to or contact with the sample surface and the rate of change in the vibration state of the probe needle detected by the detection means has exceeded a previously set threshold value.

7. A scanning method according to claim 6; wherein the vibration state of the probe needle comprises least one of a vibration amplitude, a phase of vibration and a vibration frequency of the probe needle.

8. A scanning method according to claim 6; wherein the observation data is gathered by detecting a tunnel current flowing between the probe needle and the sample.

9. A scanning method according to claim 6; wherein the control means controls the relative scanning movement between the probe needle and the sample surface while a distance of the probe needle relative to the sample surface in a perpendicular direction thereof is varied such that the rate of change in the vibration state of the probe needle becomes the set threshold value.

10. A scanning method according to claim 6; wherein when the vibration state of the probe needle has exceeded the set threshold value, the control means controls to stop relative scanning movement between the probe needle and the sample surface and the probe needle is once moved in the perpendicular direction to separate the probe needle from the sample surface.

11. A scanning probe microscope comprising:
a probe needle;
a control section that controls relative scanning movement between the probe needle and a surface of a sample in at least one direction parallel to the sample surface and controls relative movement between the probe needle and the sample surface in a direction perpendicular to the sample surface;
a vibration source that vibrates the probe needle at a vibrating frequency relative to the sample surface;
an approach/separation drive section that causes the probe needle to relatively approach to and separate from the sample surface at a predetermined distance while the probe needle is vibrated at the vibrating frequency relative to the sample surface by the vibration source;
a detection section that detects a rate of change in a vibration state of the probe needle in accordance with a distance between the probe needle and the sample surface; and an observation section that gathers observation data from the sample surface when the rate of change in the vibration state of the probe needle detected by the detection section has exceeded a preselected threshold value.

12. A scanning probe microscope according to claim 11; wherein the detection section detects the rate of change between the vibration state of the probe needle when the probe needle is caused to approach to the sample surface by the approach/separation drive section and the vibration state of the probe needle when the probe needle is caused to separate from the sample surface by the approach/separation drive section.

13. A scanning probe microscope according to claim 12; wherein the vibration state of the probe needle comprises least one of a vibration amplitude, a phase of vibration and a vibration frequency of the probe needle.

14. A scanning probe microscope according to claim 11; wherein the vibration state of the probe needle comprises least one of a vibration amplitude, a phase of vibration and a vibration frequency of the probe needle.

15. A scanning probe microscope according to claim 11; wherein the control section controls the approach/separation drive section to cause the probe needle to relatively approach to and separate from the sample surface.

16. A scanning probe microscope according to claim 15; further comprising a stage supporting the sample; and wherein the approach/separation drive section causes the probe needle to relatively approach to and separate from the sample surface by vibrating the stage to cause the sample surface to approach to and separate from the probe needle.

17. A scanning probe microscope according to claim 11; further comprising a stage supporting the sample; and wherein the approach/separation drive section causes the probe needle to relatively approach to and separate from the sample surface by vibrating the stage to cause the sample surface to approach to and separate from the probe needle.

18. A scanning probe microscope according to claim 11; wherein the observation section gathers observation data from the sample surface by detection of a tunnel current flowing between the probe needle and the sample.

* * * * *